United States Patent [19]

Jones

[11] Patent Number: 4,819,416
[45] Date of Patent: Apr. 11, 1989

[54] ROTARY CUTTING MEMBER FOR USE WITH LAWNMOWERS AND THE LIKE

[75] Inventor: Dallas W. Jones, Hartford, N.Y.

[73] Assignee: The UnBlade Co., Utica, N.Y.

[21] Appl. No.: 156,597

[22] Filed: Feb. 17, 1988

[51] Int. Cl.4 .......................... A01D 34/64; A01G 3/06
[52] U.S. Cl. .......................................... 56/12.7; 30/276
[58] Field of Search .................... 56/12.7, 295; 30/276

[56] References Cited

U.S. PATENT DOCUMENTS

| | | | |
|---|---|---|---|
| 2,924,059 | 2/1960 | Beeston, Jr. | 56/295 |
| 3,176,455 | 4/1965 | Buchanan | 56/295 |
| 3,208,209 | 9/1965 | Dunlap | 56/295 |
| 3,321,026 | 5/1967 | Hubard | 56/295 |
| 3,391,524 | 7/1968 | Nickoloff | 56/320.2 |
| 3,496,707 | 2/1970 | Kobey | 56/17.5 |
| 3,805,499 | 4/1974 | Woelffer | 56/320.2 |
| 3,895,440 | 7/1975 | Pitlinger, Jr. | 56/12.7 |
| 3,988,810 | 11/1976 | Emery | 24/128 |
| 4,054,992 | 10/1977 | Ballas | 30/276 |
| 4,062,115 | 12/1977 | Lee | 56/12.7 |
| 4,088,959 | 11/1977 | Moss et al. | 86/295 |
| 4,107,907 | 8/1978 | Rutherford | 56/320.2 |
| 4,112,653 | 9/1978 | Ballas et al. | 56/12.7 |
| 4,126,990 | 11/1978 | Fisher | 56/295 |
| 4,187,598 | 2/1980 | Pittinger | 29/513 |
| 4,219,310 | 2/1981 | Secovra et al. | 56/12.7 |
| 4,232,505 | 11/1980 | Walto | 56/320.1 |
| 4,258,536 | 3/1981 | Kidd et al. | 56/295 |
| 4,295,324 | 10/1981 | Frantello et al. | 56/12.7 |
| 4,357,789 | 11/1982 | Rodish | 56/295 |
| 4,362,007 | 12/1982 | Kennedy | 56/295 |
| 4,378,668 | 5/1983 | Gullett | 56/255 |
| 4,466,235 | 8/1984 | Cole | 56/125 |
| 4,513,563 | 4/1985 | Roser | 56/295 |
| 4,711,077 | 12/1987 | Kutsukake | 56/255 |
| 4,726,176 | 2/1988 | Mc Gren | 56/12.7 |

FOREIGN PATENT DOCUMENTS

| | | |
|---|---|---|
| 2556553 | 6/1977 | Fed. Rep. of Germany . |
| 103277 | 4/1923 | France . |
| 23800 | 3/1976 | France . |

Primary Examiner—Paul J. Hirsch
Attorney, Agent, or Firm—Shlesinger & Myers

[57] ABSTRACT

The present invention discloses an apparatus for cutting grass and the like comprising a rotary cutting member. The rotary cutting member includes a hub and a plurality of arms extending therefrom. Each of the arms includes a line holder for receiving a flexible cutting filament. The flexible cutting filaments include first and second cutting elements. The flexible cutting filaments are prestressed so that the first cutting element intersects the second cutting element thereby forming a substantially V-shaped flexible cutting filament. Each of the arms includes an air foil positioned remote from the hub. The air foil creates a low pressure area above the blade which will facilitate lifting the grass upward in the direction of the lawnmover blade.

27 Claims, 3 Drawing Sheets

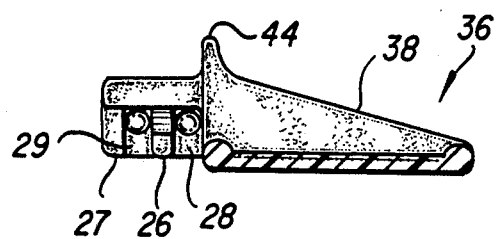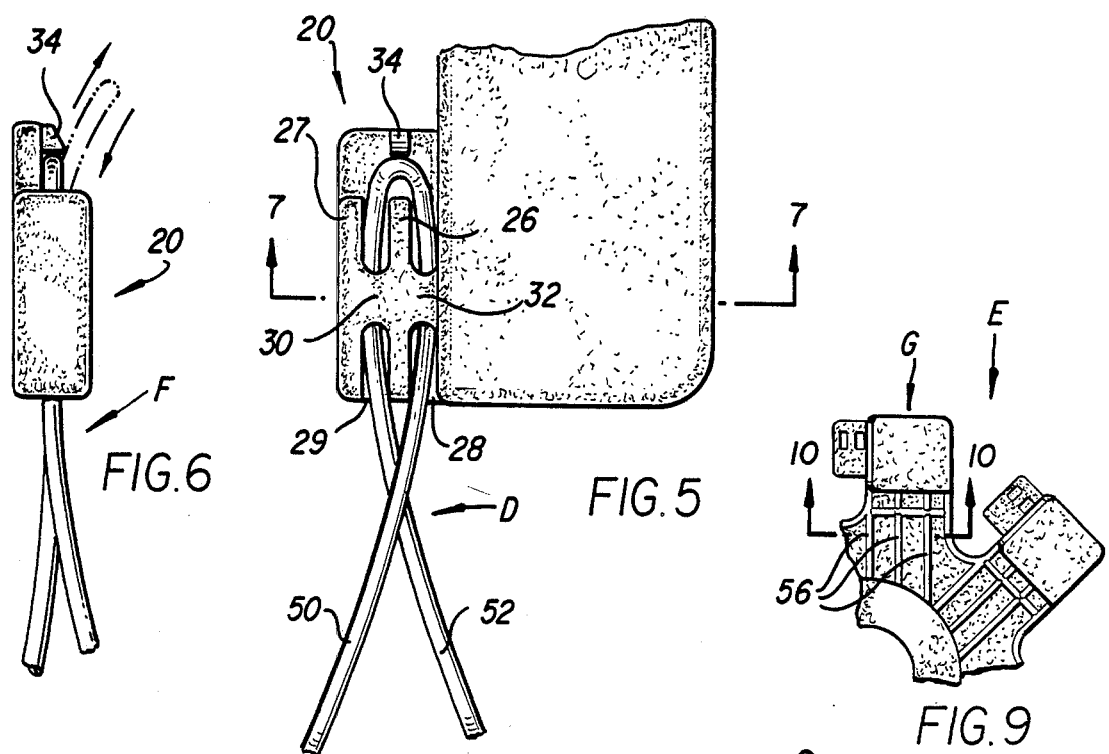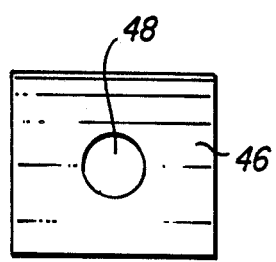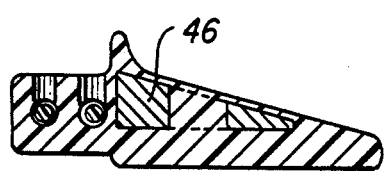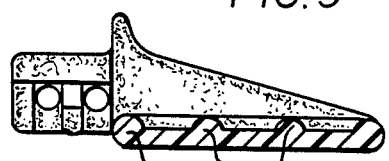

ROTARY CUTTING MEMBER FOR USE WITH LAWNMOWERS AND THE LIKE

FIELD OF THE INVENTION

This invention pertains to rotary cutting members/blades that are used with lawnmowers and the like.

BACKGROUND OF THE INVENTION

A number of arrangements have been proposed for cutting blades used in lawnmowers and similar apparatus. The following U.S. Pats. Nos. disclose a number of known cutting blades: 3,208,209 Dunlap; 3,364,500 Fox; 3,988,810 Emery; 4,054,992 Ballas; 4,126,990 Fisher; 4,187,598 Pittinger; 4,295,324 Frantello; 4,357,789 Rodish; 4,362,007 Kennedy; 4,513,563 Roser. Further, the German Pat. No. 2,556,553 discloses a rotary cutting blade.

An ever increasing concern with consumers is the potential threat of bodily harm or to life that lawnmowers present. The metallic cutting blades customarily used in lawnmowers can permanently disfigure or kill an operator or innocent bystanders. If the operator inadvertently runs over any portion of his body will be severely maimed or lossed. An alarming number of these types of accidents have been reported around the country. Further, when the operator is removing the grass catcher it is possible that his arms or hands may inadvertently slip under the housing and be severed by the lawnmower blade. Additionally, if the lawnmower blade runs over rocks, metal rods, stakes and the like it will project those object outwardly with great velocity. These objects could likely strike the operator or an innocent bystander and cause serious bodily injury or death.

As a result of the dangerous nature of lawnmowers, it has been proposed to replace the customary metallic cutting blades with flexible type filaments commonly found in edgers or trimmers. However, the known cutting blades using flexible filaments have been unable to provide an adequate alternative to the metallic cutting blade.

OBJECTS AND SUMMARY OF THE INVENTION

It is an object of the present invention to provide an improved rotary cutting member having a plurality of flexible filaments forming the cutting blade.

Another object of the present invention is to provide a rotary cutting member that will significantly reduce the danger of bodily harm associated with lawnmowers and the like.

A further object of the present invention is to provide a rotary cutting member that creates a low pressure area along its upper surface for raising up grass and directing cut grass upwardly into the lawnmower bag thereby increasing the effectiveness of the mower.

Yet another object of the present invention is to provide means for readily replacing the flexible cutting filaments once they have worn out.

Another object of the present invention is provide a rotary cutting member with a plurality of weights formed in the outer periphery thereof for opposing and moderating fluctuations in the revolutions per minute (rpm) of the output shaft of the lawnmower engine.

Still another object of the present invention is to provide a rotary cutting blade that maintains a constant rpm level thereby ensuring an even cut of the entire lawn.

A further object of the present invention is provide a flexible cutting filament having spaced cutting elements.

Yet another object of the present invention is provide a rotary cutting blade with reinforcing ribs for increasing the life of the rotary blade.

Another object of the present invention is to provide means for securing flexible cutting filaments to a rotary cutting blade including an abutment or projection for preventing detachment of the flexible cutting filaments while the rotary cutting member is in operation.

Yet a further object of the present invention is to provide a rotary cutting member having a hub and a plurality of arm extending therefrom and a cut-out formed intermediate the adjacent arms for permitting upward air flow therebetween.

In summary, the present invention includes a rotary cutting blade having a plurality of flexible filaments extending therefrom. The flexible filaments form a cutting blade for effectively cutting the grass but present no danger of bodily injury to the operator or by bystanders.

DETAILED DESCRIPTION OF THE DRAWINGS

FIG. 4 is a partial cross-sectional view of the rotary cutting member taken along lines 4—4 in FIG. 2.

FIG. 5 is an enlarged fragmentary bottom plan view of the rotary cutting member of the present invention.

FIG. 6 is a side view of the flexible cutting filament holder.

FIG. 7 is a cross-sectional view taken along lines 7—7 of FIG. 5.

FIG. 8 is a top plan view of a weight.

FIG. 9 is a partial fragmentary view of an alternative embodiment of a rotary cutting member formed in accordance with the present invention.

FIG. 10 is a cross-sectional view taken along lines 10—10 in FIG. 9.

DETAILED DESCRIPTION OF THE INVENTION

Figure 1:
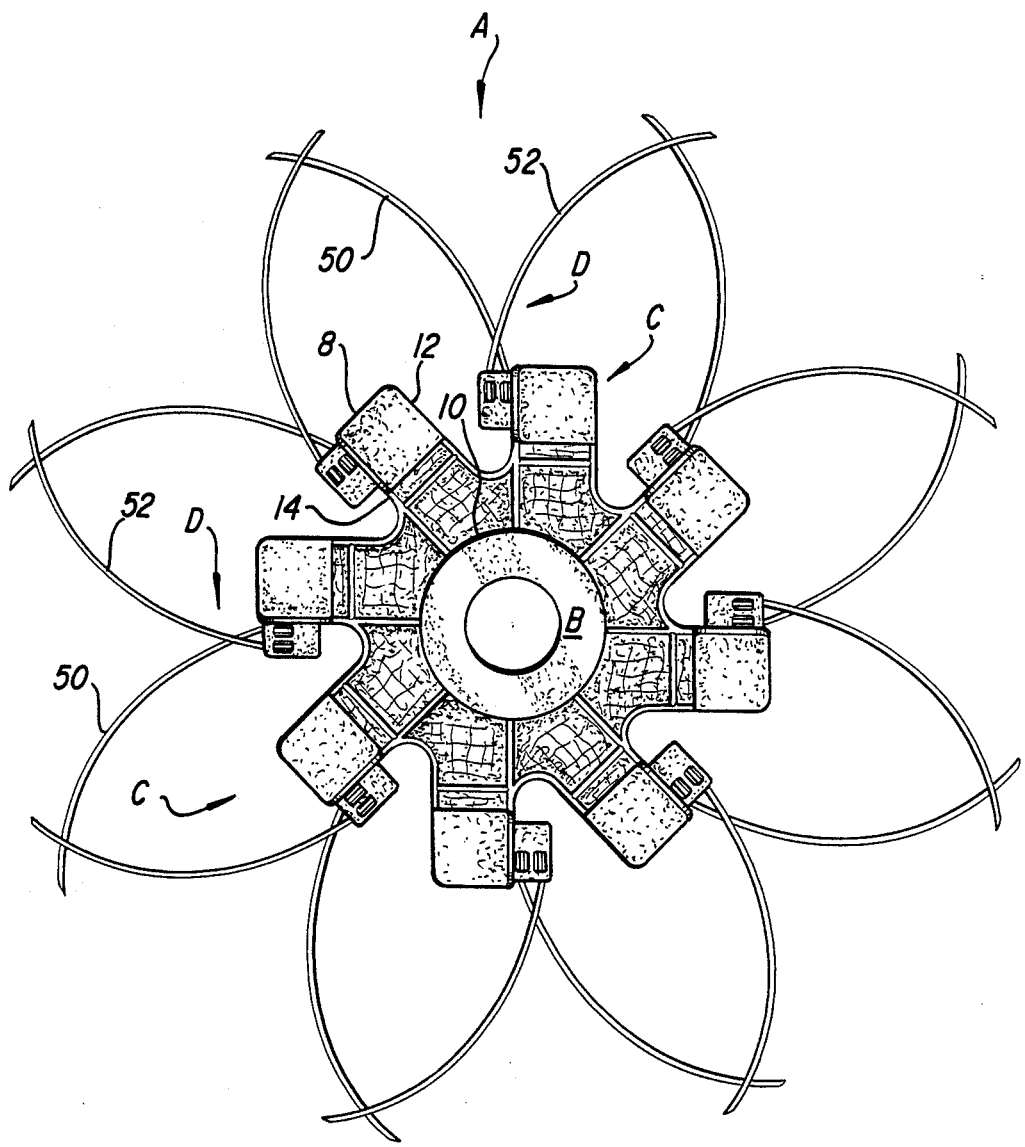
FIG. 1 is a top plan view of the rotary cutting member formed in accordance with the present invention.

Referring to FIG. 1, a rotary cutting blade A includes a hub B, eight arms C extending outwardly from hub B, and a plurality of flexible cutting filaments D. It is well within the purview of the invention to vary the number of arms C extending from rotary cutting member A.

Figure 2:
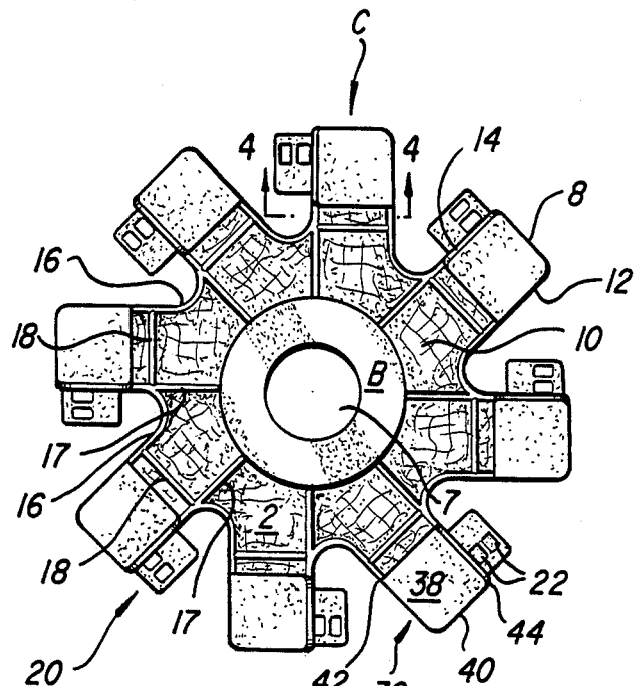
FIG. 2 is a top plan view of the rotary cutting member with the flexible cutting filaments removed.
Figure 3:
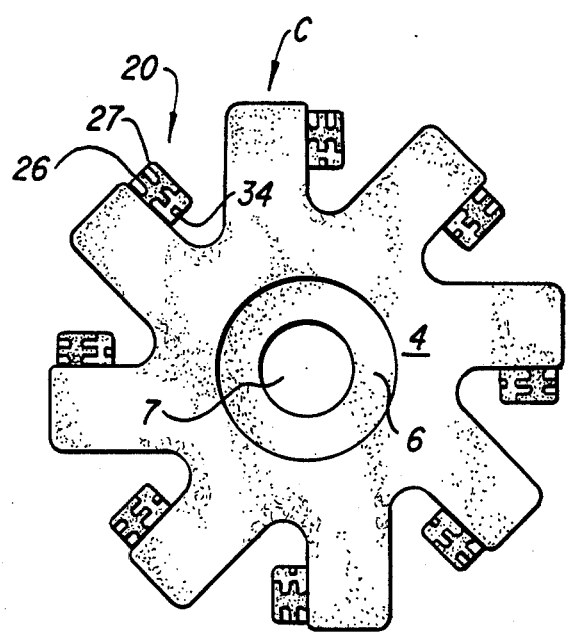
FIG. 3 is a bottom plan view of the rotary cutting member with the flexible cutting filaments removed.

The rotary cutting blade A includes upper and lower surfaces 2 and 4 respectively. The upper surface 2, best seen in FIG. 2, is positioned adjacent the housing of the lawn mower (not shown) when the rotary cutting blade A is in operation. The lower surface 4, best seen in FIG. 3, is positioned adjacent the ground when the rotary cutting blade A is in operation. The lower surface 4 is substantially planer and includes a recess 6 formed in the center of rotary blade A. The recess 6 cooperates with bore 7, best seen in FIG. 2, formed in hub B for accommodating conventional fasteners for securing the rotary cutting blade A to the lawnmower housing (not shown). The rotary cutting blade A is formed from xenoy. This material is ideal in that it provides the rotary cutting member A with the necessary durability but allows it to flex thereby maximizing its cutting efficiency. Xenoy is a plastic unreinforced polycarbonate based polymer blend.

The arms C are equidistantly spaced about the outer periphery of the hub B. Further, each arm C extends outwardly from hub B the same distance. The arms C include first and second ends 8 and 10 and leading the trailing edges 12 and 14 respectively. First end 8 is removed from hub B while second end 10 is positioned adjacent thereto. The hub B is raised upwardly above the first ends 8 of arms C. The arms C further include ribs 16, 17 and 18. Ribs 16 extend along the outer periphery of the rotary cutting blade A. Ribs 17 extend along the longitudinal axis of arms C. Ribs 18 extend substantially parallel to first ends 8 and form a right angle with ribs 17. The ribs 16, 17 and 18 further enhance the durability of blade A while permitting the rotary cutting member A to flex.

A line holder 20 extends rearwardly from the trailing edges 14 of arms C. The line holder 20 includes a pair of openings 22 formed in the upper surface 24. A pair of walls 26 and 27 extend substantially parallel to trailing edges 14 of arms C and form passageways 28 and 29 respectively for receiving flexible cutting filaments D, as best seen in FIG. 4. Retaining wall 30 joins walls 26 and 27. Further, retaining wall 32 joins wall 26 with trailing edge 14 of arms C. Retaining walls 30 and 32 prevent vertical displacement of the flexible cutting filaments D. An abutment 34 is spaced from walls 26 and positioned intermediate passageways 28 and 29. The abutment 34 prevents lateral movement of flexible cutting filaments C.

Arms C include air foils 36 formed adjacent second ends 10. Air foils 36 each include an upper surface 38, side walls 40 and 42, and rear wall 44. Upper surface 38 extends from leading edge 12 to trailing edge 14 of arms C. Side walls 40 and 42 extend parallel to each other and form a right angle with rear wall 44. Upper surface 38 forms an acute angle with lower surface 4 of rotary cutting blade A. Triangularly shaped weights 46 are positioned in each of the air foils 36, as best seen in FIG. 7. The weights 46 include a bore 48 extending therethrough, best seen in FIG. 8. During operation of the lawn mower, the air foils 36 create a low pressure area above upper surface 2 of rotary cutting member A. Thus, a partial vacuum is created. This will result in the grass being raised upwardly thereby enabling the blade A to readily cut the same. Further, the partial vacuum directs the cut grass upward into the grass catcher.

The weights 46 increase the moment of interia of the cutting blade A. The amount of interia is proportional to the weight of the particles of the cutting blade A by the square of their distance from the axis of rotation. Thus, by positioning the weights 46 at the furthest point from hub B, the moment of interia of the rotary cutting blade A is maximized. The greater the moment of interia of a body the less susceptible it is to change in speeds. Therefore, the greater the moment of interia of the rotary cutting blade A the less susceptible it is to the fluctuations in the rpm level of the output shaft of a lawnmower engine. Thus, the rotary cutting blade A will maintain a constant rpm level during operation of the lawnmower. This feature of the present invention will ensure an even cut over the entire lawn. The size of the weights can be varied to accommodate the operators specifications.

The flexible cutting filaments D include first and second cutting elements 50 and 52 respectively. First cutting element 50 is positioned in passageway 28 directly adjacent trailing edge 14 of arm C. Second cutting element 52 is positioned in passageway 29 removed from trailing edges 14. First cutting elements 50 extend rearwardly from trailing edge 14. Second cutting element 52 extends forwardly in the direction of leading edge 12. Thus, first cutting elements 50 intersect corresponding second cutting elements 52 and forms a substantially V-shaped cutting filament D. Further, flexible cutting filaments D from each of the arms C are positioned such that they overlap at least a portion of the flexible cutting filaments D extending from adjacent arms C. Thus, the flexible cutting filaments D form a continuous cutting blade while the rotary cutting member A is in a stationary position.

The flexible cutting filaments D can be readily detached from the corresponding arm C to permit replacement thereof, as best seen in FIG. 6. A force F, applied as shown in Figure 6, will cause the flexible filament D to rise above the abutment 34 which will permit an operator to readily detach the filament D from the corresponding arm C. In inserting a new filament D, the operator need only align the ends of the filaments D with passageways 28 and 29 adjacent abutment 34 and slip the filament through the passageways such that the end of the filaments D engages abutment 34.

ALTERNATIVE EMBODIMENT

Referring to FIGS. 9 and 10, an alternative embodiment of the invention will be described. Rotary cutting blade E is substantially similar to rotary cutting blade A and thus only the differences therebetween will be described.

Rotary cutting blade E includes a hub F and a plurality of arms G. The arms G include three spaced ribs 56 extending along the longitudinal axis thereof. The ribs 56 further extend parallel to each other. This embodiment provides a significantly more durable rotary cutting blade E.

While there has been herein shown and described the presently preferred from of this invention, it is to be understood that such has been done for purposes of illustration only, and that various changes may be made therein within the scope of the appended claims.

What we claim is:

1. An apparatus for cutting grass and the like, comprising:
   (a) a rotary cutting means having upper and lower surfaces;
   (b) said rotary cutting means including a hub and at least first and second arm means extending cantilevered from and circumferentially spaced about said hub;
   (c) flexible cutting means operably associated with each of said at least first and second arm means, respectively;
   (d) means operably associated with each of said at least first and second arm means for securing said flexible cutting means thereto;
   (e) said rotary cutting means having at least a first cut-out formed intermediate said first and second arm means;
   (f) said at least first cut-out extending through said rotary cutting means from said upper surface to said lower surface thereby forming a space between said first and second arm means;

(g) said arm means including leading and trailing edges and first and second ends;
(h) said second end of said arm means is positioned adjacent said hub means and said first end is positioned away therefrom;
(i) said first end includes upper and lower surfaces;
(j) said first end of said arm means being wedge-shaped in entire cross-section for thereby creating an air foil means for creating a low pressure area along said upper surface of said rotary cutting means; and
(k) the distance between said lower and upper surfaces of said first end increases with the distance from said leading edge.

2. An apparatus, as in claim 1, wherein:
(a) said securing means includes at least a first passageway;
(b) said flexible cutting means has a cross-section less than the size of said first passageway for permitting said first flexible cutting means to pass through said first passageway unobstructed; and
(c) said securing means includes abutment means positioned adjacent said flexible cutting means for preventing detachment of said first flexible cutting means from said at least first and second arm means while said rotary cutting means is rotating.

3. An apparatus as in claim 2, wherein:
(a) said securing means includes a second passageway;
(b) said first passageway extends substantially parallel to said second passageway; and
(c) said abutment means is positioned intermediate said first and second passageways.

4. An apparatus as in claim 2, wherein:
(a) said abutment means includes front and rear faces
(b) said front face is positioned adjacent said first flexible cutting means; and
(c) said front face is chamfered for facility removal of said at least first flexible cutting means from said securing means.

5. An apparatus as in claim 2, wherein:
(a) said securing means is operably associated with said trailing edge.

6. An apparatus as in claim 2, wherein:
(a) said securing means includes upper and lower surfaces;
(b) said lower surface is positioned adjacent the ground; and
(c) said abutment means extends downwardly from said lower surface.

7. An apparatus as in claim 2, wherein:
(a) said first flexible cutting means has a substantially uniform cross-section.

8. An apparatus as in claim 1, wherein:
(a) said lower surface extends substantially parallel to the ground.

9. An apparatus as in claim 1, wherein:
(a) a weight means is positioned in said at least first and second arm means for increasing the moment of inertia of said rotary cutting means.

10. An apparatus as in claim 13, wherein:
(a) said rotary cutting means includes a plurality of reinforcing means.

11. An apparatus as claim 10, wherein:
(a) said reinforcing means includes at least first and second rib means; and
(b) said first rib means forms a substantially right angle with said second rib means.

12. A apparatus as in claim 11, wherein:
(a) said at least first rib means includes at least three ribs extending outwardly from said hub.

13. An apparatus as in claim 11, wherein:
(a) said second rib means is positioned intermediate said first and second ends of said arm means.

14. An apparatus for cutting grass and the like, comprising:
(a) a rotary cutting means having upper and lower surfaces;
(b) said rotary cutting means including a hub and at least a first arm means extending from said hub;
(c) at least a first flexible cutting means;
(d) means operably associated with said arm means for securing said first cutting means thereto;
(e) said first cutting means including first and second elements;
(f) at least a portion of said first element intersects at least a portion of said second element at least while said rotary cuting means is stationary; and
(g) said intersection occurs adjacent to and spaced from said first end of said first arm means.

15. A apparatus as in claim 14, wherein:
(a) said first arm means includes leading and trailing edges;
(b) said first element is positioned adjacent said trailing edges; and
(c) said second element is removed from said trailing edge.

16. An apparatus as in claim 15, wherein:
(a) said second element extends generally in the direction of said leading edge.

17. An apparatus as in claim 16, wherein:
(a) said first element extends generally rewardly of said trailing edge.

18. An apparatus as in claim 14, wherein:
(a) said rotary cutting means includes a plurality of arm means having leading and trailing edges said arm means being circumferentially spaced about the periphery of said hub;
(b) a plurality of flexible cutting means having first and second elements;
(c) means operably associated with each of said arm means for securing at least one of said flexible cutting means to said arm means;

19. An apparatus as in claim 18, wherein:
(a) said first elements extend from the corresponding arm means generally in the direction of said arm means positioned adjacent said trailing edges of said corresponding arm means.

20. An apparatus as in claim 19, wherein:
(a) said second elements extend from the corresponding arm means generally in the direction of arm means positioned adjacent the leading edges of said corresponding arm means.

21. An apparatus as in claim 14, wherein:
(a) said rotary cutting means is formed from plastic.

22. An apparatus as in claim 14, wherein:
(a) said rotary cutting means includes air foil means formed in said arm means for creating a low pressure area along said upper surface of said rotary cutting means.

23. An apparatus as in claim 14, wherein:
(a) said rotary cutting means includes weight means positioned in said arm means for increasing the moment of inertia of said rotary cutting means.

24. An apparatus as in claim 14, wherein:

(a) said rotary cutting means includes a plurality of reinforcing means.

25. An apparatus for cutting grass and the like, comprising:
    (a) a rotary cutting means having upper and lower surfaces;
    (b) said rotary cutting means including a hub and at least a first arm means extending cantilevered from said hub;
    (c) at least a first flexible cutting means;
    (d) means operably associated with said arm means for securing said first cutting means thereto;
    (e) said arm means including first and second ends;
    (f) said first end is positioned away from said hub means and said second end is positioned adjacent said hub means;
    (g) said first end includes upper and lower surfaces; and
    (h) said first end includes embedded weight means positioned intermediate said upper and lower surfaces of said first end for increasing the moment of inertia of said rotary cutting means, thereby making said rotary cutting means less susceptible to changes in speed while rotating.

26. An apparatus as in claim 25, wherein:
    (a) said first end includes air foil means for creating a low pressure area along said upper surface of said rotary cutting means.

27. An apparatus as in claim 25, wherein:
    (a) said weight means is substantially wedge-shaped in cross-section.

* * * * *